June 8, 1954  J. SPACE  2,680,338
COTTON-PICKING MACHINE
Filed Feb. 2, 1953
2 Sheets-Sheet 1
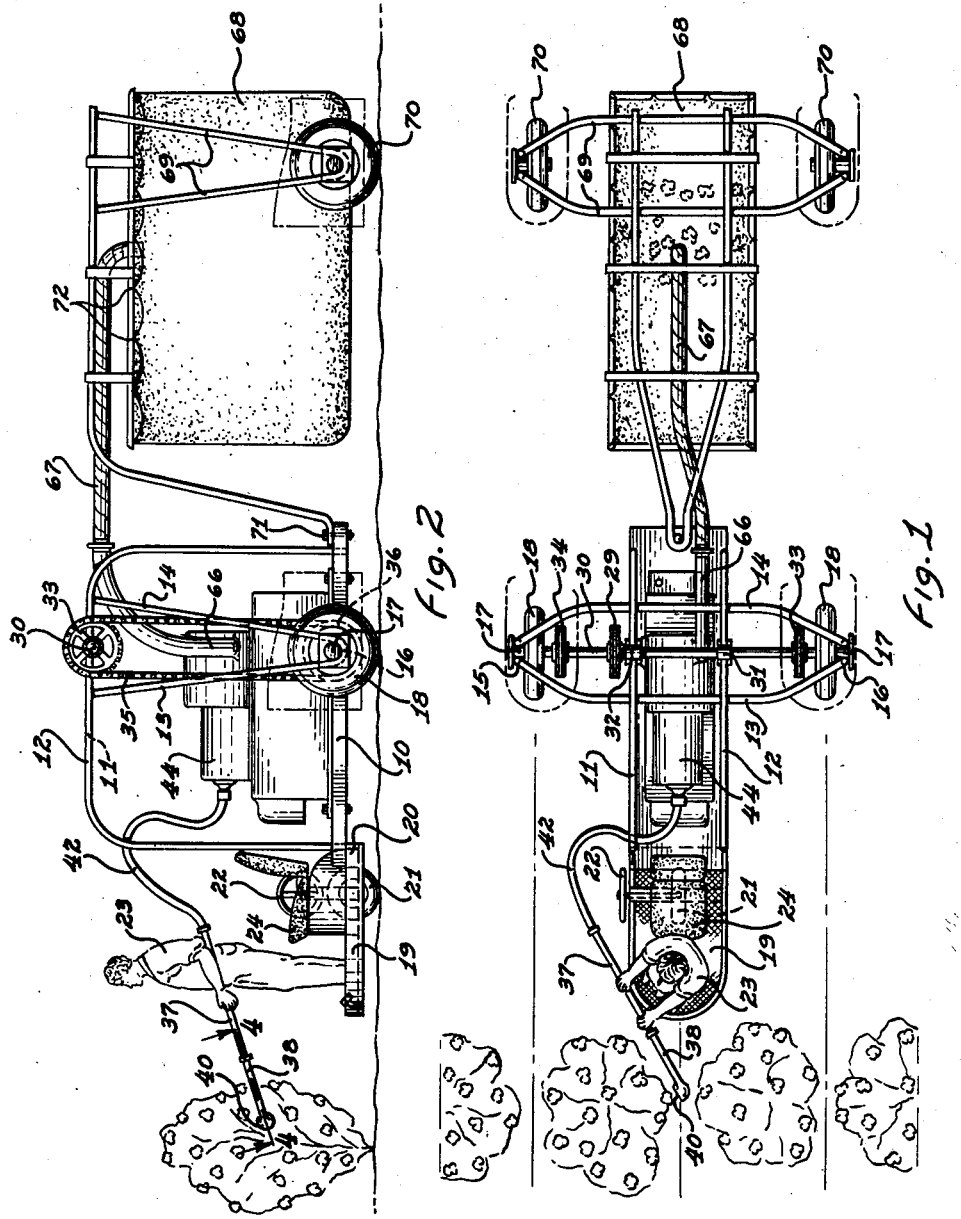
INVENTOR.
JACK SPACE.
BY
Willard S. Groen
ATTORNEY June 8, 1954

J. SPACE 2,680,338

COTTON-PICKING MACHINE

Filed Feb. 2, 1953

INVENTOR.
JACK SPACE.

BY

ATTORNEY

Patented June 8, 1954

2,680,338

UNITED STATES PATENT OFFICE 2,680,338

COTTON-PICKING MACHINE

Jack Space, Phoenix, Ariz.

Application February 2, 1953, Serial No. 334,483

4 Claims. (Cl. 56—13)

This invention relates to improvements in cotton picking, harvesting, and cleaning machines, and is particularly directed to improvements in the pneumatic removal, cleaning, and depositing the removed cotton in a receptacle for transportation to the gin.

One of the objects of this invention is to provide an improved cotton harvesting and cleaning machine wherein devices are employed which the attendants present to cotton plants to receive or gather either the open or boll cotton therefrom and then to deposit the thus picked cotton by pneumatic means in a common receptacle.

Another object of this invention comprises arranging the gathering devices of the cotton picking machine referred to so that several attendants may be enabled to carry out the picking or gathering operations together or simultaneously as the device moves over the cotton field.

Still another object of this invention is to provide an improved cotton picking machine which embodies improved harvesting means and delivers the seed cotton and also the boll cotton into a unique and novel separating and cleaning device carried along by the machine where the hulls, husks, pods or other foreign matter, such as the bolls, etc. are gathered and at once separated from the cotton.

It is also a further object of this invention to provide an improved cotton picking machine which is adapted to be drawn along the rows of a cotton field between the growing cotton plants and to gather the seed cotton that is easily separated from the hulls or that may be on the ground, and also to pick the said matured bolls from the plants and separate the cotton therefrom by pneumatic suction, separating, and pressure distributing devices which ultimately deliver the picked cotton in a receptacle carried along by the machine.

Still another object of this invention is to provide an improved cotton picking machine having a combination suction and blower mechanism with a diverter screen separating the suction and blower compartments and which serves to separate the foreign matter from the desired cotton pickings and to deposit these cotton pickings automatically in a receptacle carried along by the machine during the picking operation.

Further features and advantages of this invention will appear from a detailed description of the drawings in which:

Fig. 1 is a plan view of a cotton picking machine incorporating the features of this invention.

Fig. 2 is a side view of the machine shown in Fig. 1.

Figure 3:
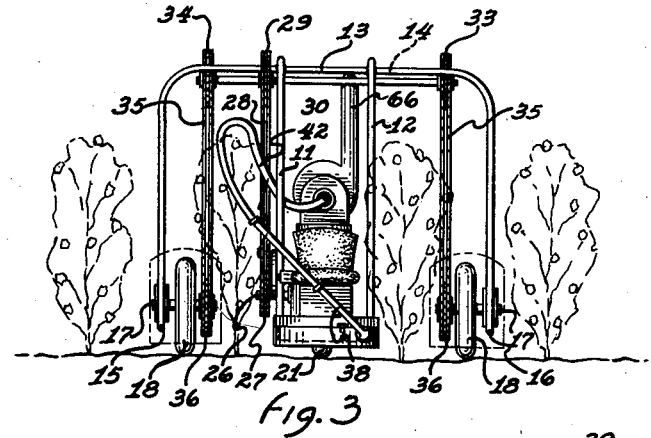
Fig. 3 is a front end view of the apparatus shown in Figs. 1 and 2.
Figure 4:
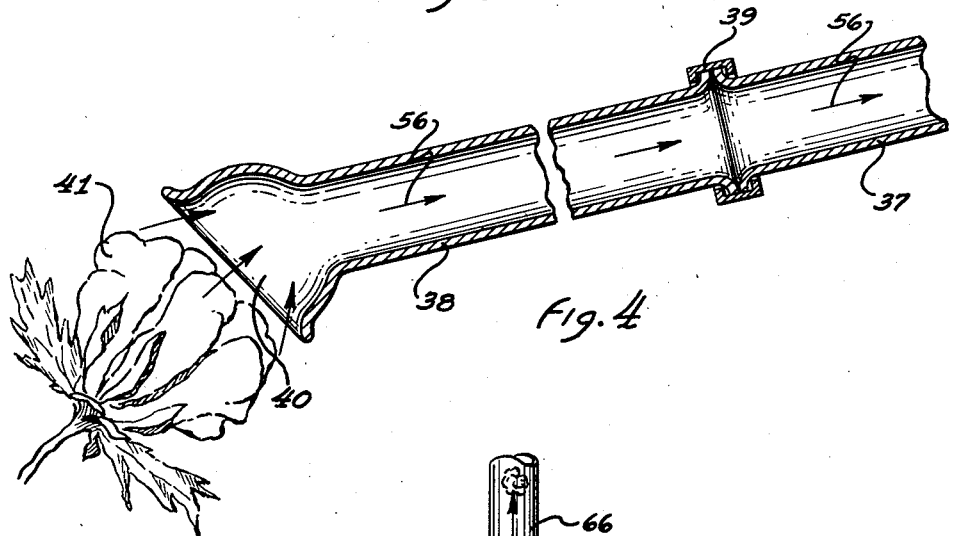
Fig. 4 is an enlarged fragmentary section through the intake pickup nozzle shown on the line 4—4 of Fig. 2.
Figure 5:
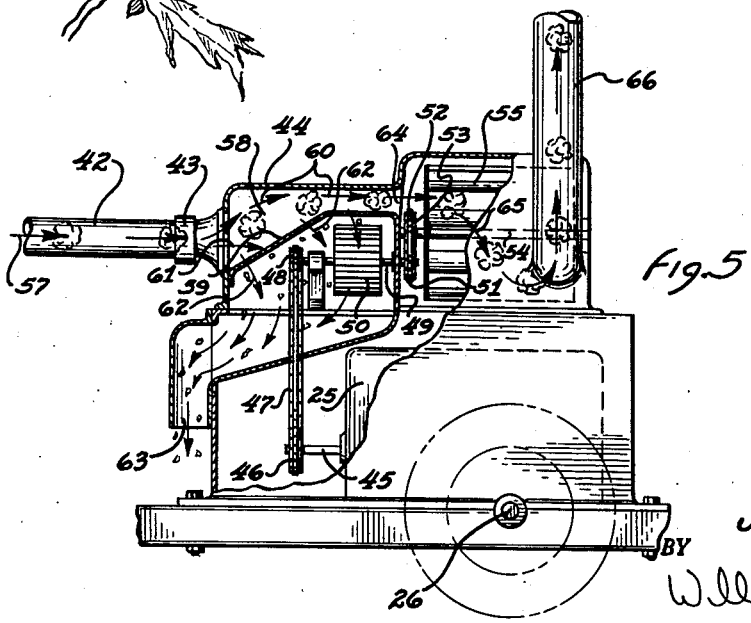
Fig. 5 is an enlarged fragmentary elevational view with parts broken away and shown in section of the combined suction and blower unit, diverter screen and cleaning device for the picked cotton.

As exemplary of one embodiment of this invention there is shown a cotton picking machine having a frame 10 which is suspended on downwardly extending support members 11 and 12, the upper ends of which members are rigidly secured to the transverse frame structure comprising the members 13 and 14, said transverse members extend downwardly and terminate in the wheel support portions 15 and 16 which carry the wheel axles 17 upon which are journaled the ground contacting wheels 18. An operator's platform 19 is suitably connected at 20 to the frame 10 and has a ground contacting steerable wheel 21 which may be manipulated by a suitable steering wheel 22 by the operator 23 both when standing picking the cotton as shown best in Figs. 1 and 2 or when on the driver's seat 24 in manipulating the apparatus into picking position or transporting it along the road.

A suitable power unit which may take the form of an internal combustion engine 25 or the like has a power takeoff shaft 26 to which is fixed a drive sprocket 27 over which operates the chain 28 to drive a sprocket 29 fixed on the transverse shaft 30 in the upper portion of the frame structure 11—12 and 13—14 as best seen in Fig. 1. Suitable journal bearings 31 and 32 are provided for the shaft 30 and on the outer ends of the shaft 30 are fixed the wheel driving sprockets 33 and 34 over which operate the wheel driving chains 35, each of which operates over sprockets 36 which are suitably connected in driving relationship to the ground contacting wheels 18 so that power from the unit 25 may be utilized to transport and effect feeding movement of the cotton picking machine along the cotton rows during the picking operation.

The operator 23 manipulates the suction tube 37 on the outer end of which is connected the suction nozzle 38 suitably connected to the suction pipe 37 by a swivel joint at 39. The outer end of the suction nozzle member 38 terminates in a bell-shaped inlet 40 which may be proportioned to suit the size and type of cotton bolls 41 to be picked. The suction pipe 37 is connected through a flexible hose 42 to the inlet 43 of the suction and cleaning chamber 44 of the apparatus. From a second power output shaft 45 of the power unit 25 power is transmitted through a sprocket 46 through a chain 47 to a sprocket 48 on the shaft 49 upon which is carried the vacuum or suction fan 50. The shaft 49 also has a sprocket 51 over which operates a chain 52 connected to the sprocket 53 on the shaft 54 of the blower fan 55. As the picked cotton proceeds through the nozzle 38 as indicated by the arrow 56 and through the flexible hose 42 as shown by the arrow 57 it comes in to the chamber 58 of the suction member 44 where it is deflected by an angularly disposed screen 59 so that the cotton proceeds in the direction indicated by the arrow 60 while the heavier materials and trash engage the screen and tend to continue in a horizontal direction indicated by the arrow 61. This would normally cause the trash to pass through the screen while enabling the picked cotton to continue on in the direction indicated by the arrow 60. However, in order to avoid any possibility of incorrect cleaning by relying solely on the inertia or change of direction of the heavier trash materials, applicant provides a vacuum fan 50 which forceably sucks the heavier material through the screen in the direction indicated by the arrow 62 and causes them to be deflected downwardly and out through the discharge trash opening 63 of the unit 44.

Further, the blower fan intake suction at the point 64 is such as to cause the cotton boils to roll along over or pass by the deflecting screen 59 and proceed in the direction indicated by the arrow 65 through the blower fan system and out through the discharge pipe 66 which is connected by suitable flexible discharge tube means 67 into a suitable pickup bag 68 carried on a frame work indicated generally at 69 on the wheel 70, and which bag when loaded may be transported to the gin by uncoupling the bag carrying unit at the point 71 or by merely removing the bag from the unit by removing its clips at 72 and dumping the bag in a nearby cotton trailer, truck, or the like.

It will thus be noted that a simple unit has been developed in which one or more operators 23 could be provided on the front platform 19 if desired and that the operator merely manipulates the nozzle 38 to pick up the cotton from the plant or any cotton which may have fallen to the ground so as to get a substantially complete picking and cleaning of the cotton plants in the field with a minimum of loss and no physical damage to the cotton plants themselves. The machine is therefore economical in operation in contrast to highly elaborate conventional cotton picking machines and also does no damage whatever to the cotton plants. This is quite important where several different pickings must be made in order to clean up all of the total output of the plants. When a cotton picking machine of conventional design is used in harvesting a field of cotton, a great deal of cotton is knocked to the ground and damaged. Such unfavorable procedure is completely avoided by applicant's present machine.

It is also to be noted that a unique arrangement has been provided in a combination vacuum or suction fan with a blower fan separated by an angularly disposed trash separation screen in a unique manner to afford a positive way of separating the trash from the cotton to give a much higher quality product for ginning.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A cotton picking machine having a suction and cleaning unit comprising, a suction chamber, a horizontal suction inlet pipe, a pick-up nozzle, a flexible conduit inter-connected between said nozzle and said suction inlet pipe, a trash separating screen angularly disposed in upwardly slanting position in said suction chamber relative to the horizontal direction of trajectory of the cotton and trash coming in through said suction inlet pipe, a vacuum fan in said suction chamber on the other side of said angularly disposed screen from said suction inlet pipe, a trash discharge outlet pipe connected from said vacuum fan, a blower fan compartment, a blower fan in said compartment, an inlet connection for said blower fan connected to said suction chamber horizontally disposed on the same side of said screen as said suction inlet pipe, and a cleaned cotton discharge outlet pipe from said blower fan connected to a receiver bag or the like.

2. In a cotton picking machine having a suction and cleaning unit comprising, a suction chamber, a horizontal suction inlet pipe, a pickup nozzle, a flexible conduit interconnected between said nozzle and said suction inlet pipe, a trash separating screen angularly disposed in upwardly slanting position in said suction chamber relative to the horizontal direction of trajectory of the cotton and trash coming in through said suction inlet pipe, a vacuum fan in said suction chamber on the other side of said angularly disposed screen from said suction inlet pipe, a trash discharge outlet pipe connected from said vacuum fan, a blower fan compartment, a blower fan in said compartment, an inlet connection for said blower fan connected to said suction chamber horizontally disposed on the same side of said screen as said suction inlet pipe, a cleaned cotton discharge outlet pipe from said blower fan connected to a receiver bag or the like, and a power unit connected to drive both said vacuum fan and said blower fan simultaneously.

3. In a cotton picking machine having a suction and cleaning unit comprising, a suction chamber, a horizontal suction inlet pipe, a pick-up nozzle, a flexible conduit interconnected between said nozzle and said suction inlet pipe, a trash separating screen angularly disposed in upwardly slanting position in said suction chamber relative to the horizontal direction of trajectory of the cotton and trash coming in through said suction inlet pipe, a vacuum fan in said suction chamber on the other side of said angularly disposed screen from said suction inlet pipe, a trash discharge outlet pipe connected from said vacuum fan, a blower fan compartment, a blower fan in said compartment, an inlet connection for said blower fan connected to said suction chamber horizontally disposed on the same side of said screen as said suction inlet pipe, a cleaned cotton discharge outlet pipe from said blower fan connected to a receiver bag or the like, and a power unit connected to drive both said vacuum fan and said blower fan including, an output shaft from said power unit, a vacuum fan shaft journalled in said suction chamber and rotatably supporting said vacuum fan thereon, power transmission means between said output shaft and said vacuum fan shaft, a blower fan shaft journalled in said blower fan compartment and rotatably supporting said blower fan thereon, and a power transmission interconnecting said vacuum fan shaft and said blower fan shaft.

4. In a cotton picking machine, a frame, a suction chamber on said frame, a horizontally disposed inlet pipe connected into one side of said suction chamber, a trash separating screen fixed in said suction chamber in an upwardly inclined position in the direction of trajectory of said inlet pipe, a horizontal top portion on said suction chamber, a horizontally disposed screen connected to the upper edge of said trash separating screen located closely adjacent said top portion of said suction chamber to form a restricted horizontal discharge passageway between said top and said horizontally disposed screen, a suction fan journalled on said frame and located on the opposite side of said trash separating screen from said inlet pipe and below said horizontally disposed screen, a trash discharge outlet pipe connected to said suction chamber adapted to receive the discharge from said suction fan, a blower fan chamber on said frame adjacent said suction chamber having an inlet in communication with said restricted horizontal discharge passageway in said suction chamber, a blower fan journalled on said frame located in said blower fan chamber, a cotton discharge outlet pipe connected to said blower fan chamber, and means for simultaneously driving said fans.

References Cited in the file of this patent

UNITED STATES PATENTS

| Number | Name | Date |
|---|---|---|
| Re. 16,055 | Schofield | Apr. 28, 1925 |
| 362,041 | Sailor | Apr. 26, 1887 |
| 682,816 | Siefert | Sept. 17, 1901 |
| 767,058 | Harvin | Aug. 9, 1904 |
| 1,090,606 | Epps | Mar. 17, 1914 |
| 1,149,253 | Dickerson | Aug. 10, 1915 |
| 1,239,343 | Boig | Sept. 4, 1917 |
| 1,314,437 | Silverthorn | Aug. 26, 1919 |
| 1,328,386 | Matthiessen | Jan. 20, 1920 |
| 1,448,930 | McElroy | Mar. 20, 1923 |
| 1,501,334 | Hanson | July 15, 1924 |
| 1,941,124 | Ziegler | Dec. 26, 1933 |
| 2,079,547 | Court | May 4, 1937 |
| 2,123,405 | Court | July 12, 1938 |
| 2,439,718 | Conrad | Apr. 13, 1948 |